(12) United States Patent  
Krysinski et al.

(10) Patent No.: US 7,769,619 B1
(45) Date of Patent: Aug. 3, 2010

(54) AUTOMATED BUSINESS MACHINE MANAGEMENT

(75) Inventors: Donald S. Krysinski, Santa Ana, CA (US); Paul D. Archer, Littleton, CO (US); Duane L. Elmer, Littleton, CO (US)

(73) Assignee: Imaging Portals, Inc., Simi Valley, CA (US)

( * ) Notice: Subject to any disclaimer, the term of this patent is extended or adjusted under 35 U.S.C. 154(b) by 2872 days.

(21) Appl. No.: 09/929,398

(22) Filed: Aug. 14, 2001

Related U.S. Application Data (60) Provisional application No. 60/225,369, filed on Aug. 14, 2000.

(51) Int. Cl.
   *G06F 9/46* (2006.01)
(52) U.S. Cl. .................... 705/9; 705/7; 705/8
(58) Field of Classification Search .......... 705/9, 705/7
   See application file for complete search history.

(56) References Cited

U.S. PATENT DOCUMENTS

| | | | |
|---|---|---|---|
| 3,400,378 A | 9/1968 | Smith et al. | 340/870.11 |
| 3,859,462 A | 1/1975 | Saxon | 379/102.01 |
| 4,258,421 A * | 3/1981 | Juhasz et al. | 701/35 |
| 4,899,370 A | 2/1990 | Kameo et al. | 379/102.03 |
| 5,084,875 A | 1/1992 | Weinberger et al. | 714/46 |
| 5,127,012 A | 6/1992 | Hiliger | 714/46 |
| 5,184,179 A * | 2/1993 | Tarr et al. | 399/8 |
| 5,214,772 A | 5/1993 | Weinberger et al. | 714/47 |
| 5,224,157 A | 6/1993 | Yamada et al. | 379/100.05 |
| 5,226,074 A | 7/1993 | Han | 379/100.05 |
| 5,257,069 A | 10/1993 | Hirata et al. | 399/8 |
| 5,291,420 A | 3/1994 | Matsumoto et al. | 702/122 |
| 5,293,196 A | 3/1994 | Kaneko et al. | 399/18 |
| 5,295,182 A | 3/1994 | Fujii | 379/100.05 |
| 5,333,286 A | 7/1994 | Weinberger et al. | 714/47 |
| 5,361,265 A | 11/1994 | Weinberger et al. | 714/47 |
| 5,365,310 A | 11/1994 | Jenkins et al. | 399/8 |
| 5,369,471 A * | 11/1994 | Yamada | 399/8 |
| 5,388,252 A | 2/1995 | Dreste et al. | 714/46 |
| 5,392,095 A | 2/1995 | Siegel | 399/8 |

(Continued)

FOREIGN PATENT DOCUMENTS

GB 2235110 A * 2/1991

(Continued)

OTHER PUBLICATIONS

Caruso, Children's hospital shines light on net problems, Network World, Dec. 14, 1998, v.15, n. 50, p. 27 (1 page).*

(Continued)

*Primary Examiner*—Johnna Loftis
(74) *Attorney, Agent, or Firm*—Townsend and Townsend and Crew LLP (57) ABSTRACT

According to the invention, a process for automating management of a service contract for a business machine associated with a user is disclosed. In one step, A data capture device is provided proximate to a business machine. A threshold event associated with the service contract is determined and programmed into the data capture device. In another step, notification of triggering of the threshold event is received. Information related to the service contract is reported electronically and automatically to the user based, at least in part, upon the receiving of the trigger notification.

24 Claims, 10 Drawing Sheets

U.S. PATENT DOCUMENTS

| | | | | |
|---|---|---|---|---|
| 5,394,458 | A | | 2/1995 | Allen et al. ............... 379/9.06 |
| 5,398,257 | A | | 3/1995 | Groenteman ............... 375/130 |
| 5,404,199 | A | | 4/1995 | Hirata et al. ............... 399/8 |
| 5,412,779 | A | | 5/1995 | Motoyama ............... 399/8 |
| 5,446,522 | A | | 8/1995 | Tahara et al. ............... 399/8 |
| 5,515,171 | A | | 5/1996 | Nara et al. ............... 358/296 |
| 5,568,618 | A | | 10/1996 | Motoyama ............... 710/100 |
| 5,603,060 | A | | 2/1997 | Weinberger et al. ............ 399/8 |
| 5,673,190 | A | | 9/1997 | Kahleck et al. ............... 700/2 |
| 5,748,716 | A | | 5/1998 | Levine ............... 379/102.03 |
| 5,757,643 | A | | 5/1998 | Kuroda et al. ............... 700/9 |
| 5,805,416 | A | * | 9/1998 | Friend et al. ............... 361/686 |
| 5,819,110 | A | | 10/1998 | Motoyama ............... 710/15 |
| 5,822,221 | A | | 10/1998 | Groenteman ............... 702/188 |
| 5,835,816 | A | | 11/1998 | Sawada et al. ............... 399/8 |
| 5,870,698 | A | | 2/1999 | Riedel et al. ............... 702/182 |
| 5,894,416 | A | | 4/1999 | Kuroyanagi et al. ........... 700/9 |
| 5,909,493 | A | | 6/1999 | Motoyama ............... 713/154 |
| 5,915,026 | A | | 6/1999 | Mankovitz ............... 713/168 |
| 5,930,342 | A | | 7/1999 | Mazzapica ............ 379/102.01 |
| 5,933,675 | A | | 8/1999 | Sawada et al. ............... 399/8 |
| 5,933,676 | A | | 8/1999 | Ohno ............... 399/8 |
| 6,009,284 | A | * | 12/1999 | Weinberger et al. ............ 399/8 |
| 6,088,659 | A | * | 7/2000 | Kelley et al. ............... 702/62 |
| 6,351,621 | B1 | * | 2/2002 | Richards et al. ............. 399/111 |
| 6,452,689 | B1 | * | 9/2002 | Srinivasan ............... 358/1.15 |
| 6,457,038 | B1 | * | 9/2002 | Defosse ............... 709/200 |
| 6,532,351 | B2 | | 3/2003 | Richards et al. ............. 399/111 |
| 6,631,247 | B1 | | 10/2003 | Motoyama et al. ............. 399/8 |
| 6,701,231 | B1 | * | 3/2004 | Borugian ............... 701/30 |
| 6,885,903 | B2 | * | 4/2005 | Olle et al. ............... 705/9 |
| 6,909,909 | B2 | * | 6/2005 | Izumi ............... 455/557 |
| 7,177,040 | B2 | * | 2/2007 | Roosen et al. ............. 358/1.15 |
| 2002/0099579 | A1 | * | 7/2002 | Stowell et al. ............... 705/7 |

FOREIGN PATENT DOCUMENTS

| | | | |
|---|---|---|---|
| JP | 55086255 A | * | 6/1980 |
| WO | WO-9815075 A2 | * | 4/1998 |

OTHER PUBLICATIONS

Gralla, How the Internet works, 1999, ch.2, p. 8-11 (6 pages).*

Anonymous, TelAlert integrated with HP OpenView, HP Chronicle, Feb. 2000, v.17, n.3, p. 4 (1 page).*

Business Editors and High-Tech Writers, TelAlert chosen for remote notification at ITUG, Business Wire, Oct. 27, 1998, [online], [retrieved Aug. 16, 2005 via Proquest ID:35396379] (2pages).*

Business Editors and High-Tech Writers, Repeat/Telamon products to be resold by HP, Business Wire, Jun. 10, 1998, [online], [retrieved Aug. 16, 2005 via Proquest ID:30084834] (2 pages).*

Anonymous, Proactive networks pronto watch v2.5 now integrated with telamon telalert notification system, PR Newswire, Nov. 2, 1998, [online], [retrieved Aug. 16, 2005 via Proquest ID:3564629] (3 pages).*

Business Editors Support Services Conference and Expo Booth No. 217, TelAlert to be distributed with remedy help desk, Business Wire, Mar. 29, 1999, [online], [retrieved Aug. 16, 2005 via Proquest ID:40091066] (2 pages).*

Business Editors and Technology Writers, Telamon TelAlert integrated with NetIQ AppManager Suite, Buisness Wire, Dec. 7, 1998, [onine], [retrieved Aug. 15, 2005 via Proquest ID:36556601] (2 pages).*

Business Writers, TelAlert sets the standard for notification and remote response, Business Wire, Apr. 28, 1998, [online], [retrieved Aug. 16, 2005 via Proquest ID:29041567] (2 pages).*

Business Editors and Telecommunications Writers, Telalmon's TelAlert delivers new enhancements to its users, Business Wire, Mar. 29, 1999, [online], [retrieved Aug. 16, 2005 via Proquest ID:40091079] (2 pages).*

Hubbard, A licence to print, Computing Canada, May 18, 2001, v.27, n. 11, p. 16, [online], [retrieved Aug. 16, 2005 via Proquest ID:631700181] (3 pages).*

Anonymous, Speed up mobile business, Communications News, Jan. 2000, v.37, n. 1, p. 18 (2 pages).*

CopiersNow Raises $11 Million in SEcond Round Funding; Company Targets 50 Markets for Rollout of Innovative Copier Sales STrategy. Business Wire Jan. 2, 2001 dialog file 610: 00434337.*

Ward, Leah Beth. Denver-Area Copier Firm Starts Online Venture in Texas. Dallas Morning News. Mar. 20, 2001. dialog file 9: 02406783.*

CopiersNow Launches in Dallas; Company Makes Texas a Priority in its National Expansion Plans. Business Wire. Mar. 20, 2001. dialog file 16: 08439250.*

* cited by examiner

AUTOMATED BUSINESS MACHINE MANAGEMENT

This application claims the benefit of U.S. Provisional Patent Application No. 60/225,369 filed on Aug. 14, 2000.

BACKGROUND OF THE INVENTION

This invention relates in general to business machines and, more specifically, to managing business machines.

Business machines such as copiers, printers, fax machines, scanners, and multi-function devices are integral to any business operation. Service and supplies are needed to maintain proper operation of these business machines. An office worker typically makes the service calls and orders supplies for the business machine, which is a laborious process.

Maintenance contracts often cover service calls for business machines. These maintenance contracts may run for a period of time or a number of copies, prints, faxes, and/or scans. The business machine may include an external or internal device that monitors some operation of the business machine. A meter on this device is read each month, or some other period, and that reading is manually reported back to the maintenance organization. For example, a questionnaire may be sent to the office worker to add the meter reading and fax that questionnaire back. On that same questionnaire, the office worker may order supplies for the business machine.

BRIEF DESCRIPTION OF THE DRAWINGS

The present invention is described in conjunction with the appended figures.

In the appended figures, similar components and/or features may have the same reference label.

DESCRIPTION OF THE SPECIFIC EMBODIMENTS

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

The present invention provides a system and method for automating service contracts for business machines. In one embodiment, a data capture device is associated with the business machines in the system. Each data capture device is loaded with one or more threshold events corresponding to a supplies and/or service contract for the associated business machine. When a threshold event is triggered a message, bill, service call, etc. is automatically generated. Service calls are automatically scheduled and dispatched by the system after they are reported. In some cases, the data capture device automatically initiates the service call.

Figure 1A:
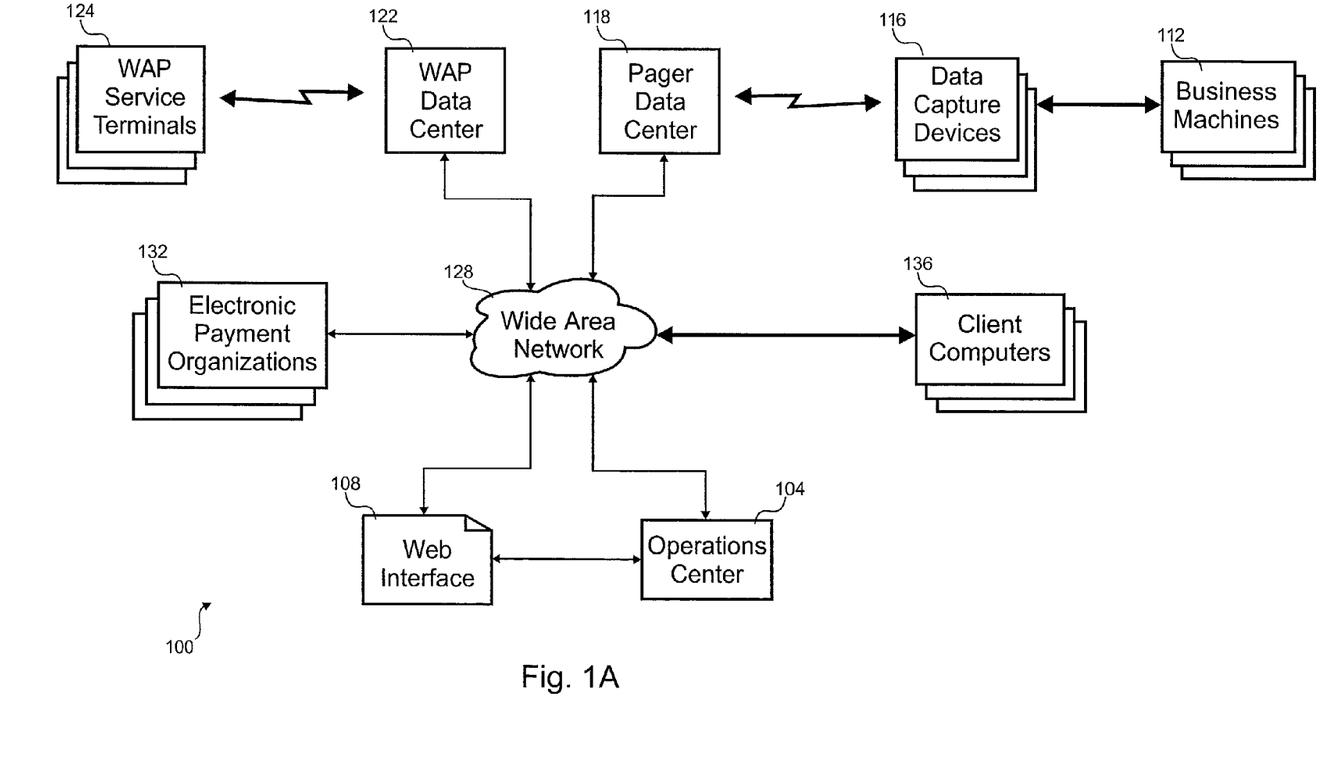
FIG. 1A is a block diagram of an embodiment of a business machine management system.

Referring initially to FIG. 1A, a block diagram of an embodiment of a business machine management system 100 is shown. This embodiment automates interaction between the system 100 and customers when configuring service contracts and maintaining a business machine 112 covered by that service contract. Billing of service contracts and scheduling service orders is automated in this embodiment, such that only a user and a technician need normally interact with the management system 100.

A client computer 136 with a web browser or equivalent logs onto a wide area network 128 such as the Internet. The web browser pulls down web pages from a web interface 108. These web pages allow buying or leasing a piece of business equipment 112. Copiers, fax machines, printers, scanners or multi-function devices that perform at least two of the forgoing functions are considered business equipment 112 regardless of whether those machines are used at a business. Additionally, the web pages allow interaction with billing and service functions. Some information, such as bills and supply orders, are available from the web interface as well as electronic message formats such as e-mail, instant messaging, wireless application protocol (WAP) messaging, etc.

The web interface 108 serves as the user interface (UI) to the operations center 104. Management of the system 100 is performed by the operations center 104. Service scheduling, message processing, billing, data mining, and database storage are just some of the major functions of the operations center 104. By communicating over the Internet 128 or some other network, the operations center 104 arbitrates payment for business machines 112 and service contracts.

A number of electronic payment organizations 132 provide payment in the conventional manner. Examples of electronic payment organizations include credit card companies, debit card companies, banks, and bill payment services. A number of business machines 112 are communicating with a respective data capture device 116 to facilitate management by the system 100. Each business machine 112 under a service contract is issued a data capture device 116 such that there is a data capture device 116 for each business machine 112 capable of interfacing with the data capture device 116. Where a data capture device 116 is not issued, manual readings from the business machine 112 are performed.

The data capture device 116 logs events reported from the business machine 112 and includes threshold events that trigger communication back to the operations center 104. The threshold events could include errors detected, usage counts, tamper detection, power loss or predetermined time periods. In this embodiment, the operations center 104 determines the threshold events and programs the data capture device 116 remotely, but some embodiments could enter some of the threshold events by direct connection to the data capture device 116.

The data capture devices 116 wirelessly communicate via a pager channel to the pager data center 118. Other embodiments of data capture device 116 could use cellular data, satellite, personal communication service, wireless networking, or other wireless data communication technologies to communicate with the operations center 104. This embodiment uses a MOTOROLA™ pager module with SKYTEL™ providing nation-wide paging service. Any communication with the pager is carried by the pager data center 118 to and from the operations center 104 using the wide area network 128.

The operations center 104 also wirelessly communicates with wireless application protocol (WAP™) service terminals 124. Each service technician is issued a service terminal 124 that could be any portable device with wireless data communication, for example, a WAP enabled phone, a pager or a PDA with wireless capability. The WAP data center 122 interfaces to the wide area network 128 to convert messages for wireless transport between the network 128 and the WAP service terminal 124.

Figure 1B:
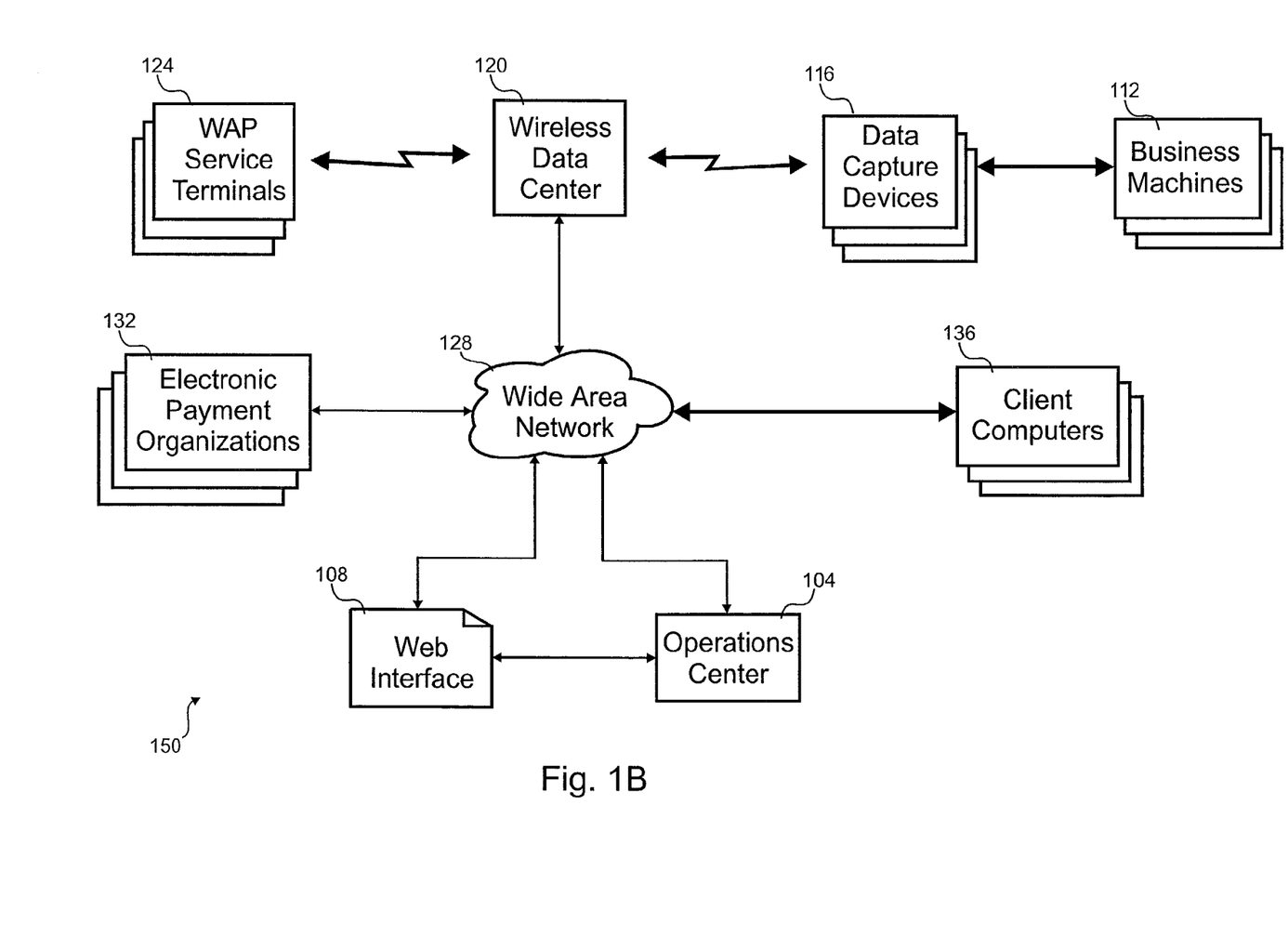
FIG. 1B is a block diagram of an embodiment of another business machine management system that has a combined wireless data center.

With reference to FIG. 1B, a block diagram of an embodiment of another business machine management system 150 is shown that has a combined wireless data center 120. This wireless data center 120 communicates with both the WAP service terminals 124 and the data capture devices 116. For example, the data capture device could include a WAP module for this communication. Each data capture device 116 and each WAP service terminal 124 is addressable to properly route traffic to and from the operations center 104.

Figure 2:
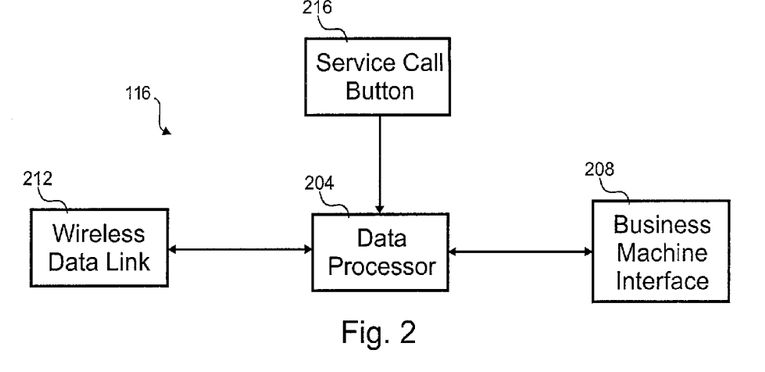
FIG. 2 is a block diagram of an embodiment of a data capture device.

Referring next to FIG. 2, a block diagram of an embodiment of a data capture device 116 is shown. Information is collected and reported by the data capture device 116 to the operations center 104. Threshold events are loaded in the data capture device 116 from the operations center 104. These threshold events may include requirements resulting from the service contract chosen by the user. Included in the data capture device 116 are a data processor 204, a business machine interface 208, a wireless data link 212, and a service call button 216.

Service calls can be initiated in a number of ways, but one way is by way of the service call button 216. Activation of this button causes a service call to be issued to the operations center 104. Some embodiments may integrate this function into the business machine 112 such that the existing interface to the business machine 112 can be used to initiate the service call.

In this embodiment, the wireless data link is a two-way pager module available from MOTOROLA™, but any wireless data link could be used. Different modules may be used in different geographic locations as dictated by the wireless data services available. Some embodiments of the data capture device 116 use a modular approach such that the wireless data link 212 is easily interchangeable. Where the data link is limited to messages of a limited size, messages sent by the data processor may span a number of wireless messages.

The data capture device 116 interfaces with an associated business machine 112 using the interface 208. Most business machines have some sort of interface port and typically this port uses a serial protocol. The business machine interface 208 could be a simple connector adapter or could include circuit elements dictated by the interface to the business machine 112. In some cases, the business machine 112 does not have an interface port such that the business machine interface 208 may include sensors to collect usage counts and other information for the data processor 204. The business machine interface 208 is modular such that it may be easily interchanged such that the data capture device 116 can accommodate a number of different business machines 112.

The data processor 204 interacts with the business machine interface 208 to provide status information to the operations center 104. The protocol used by the business machine 112 may be translated by the data processor 204. The data processor 204 is configured to understand the protocol of the business machine 112. Threshold events are downloaded to the data processor 204 such that when the threshold is crossed, a trigger activates some action. For example, the data processor 204 may send a message to the operations center 104 when a service contract is about to expire. Further information can be gathered by the operations center 104 by polling the data processor 204 for that information. Use of threshold events in this embodiment, allows avoiding the need to poll the data processor 204 more frequently.

Error conditions in the business machine 112 that require service are determined by the data processor 204. A communication to the operations center 104 initiates a service call to a technician. Status information related to the service call can be included in the service call such that the technician has a description of a purpose for the service call. The operations center 104 can wirelessly issue these service calls to technicians without a need for human interaction to automate the service call and improve response times.

Figure 3:
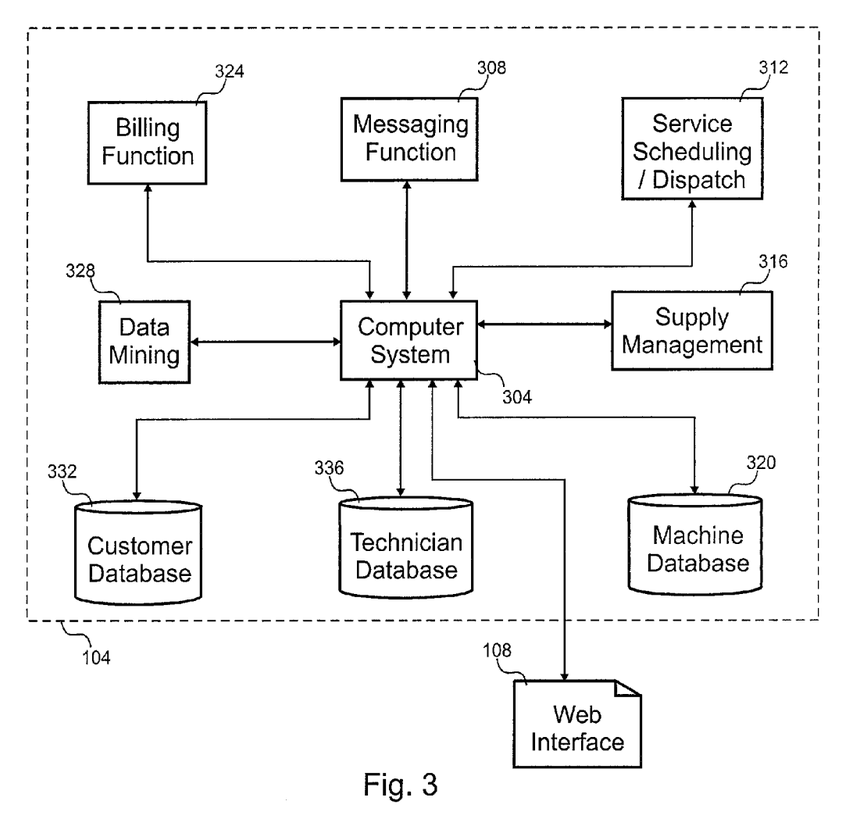
FIG. 3 is a block diagram of an embodiment of an operations center coupled to a web interface.

With reference to FIG. 3, a block diagram of an embodiment of an operations center 104 coupled to a web interface 108 is shown. A computer system 304 with a wide area network interface runs applications such as a billing function 324, a messaging function 308, a service scheduling and dispatch function 312, a supply management function 316, a data mining function 328, a business machine database 320, a technician database 336, and a customer database 332. Those skilled in the art appreciate that these applications could run on any number of computers in the computer system 304 where the computers have any number of configurations. Further, the applications could be located in disparate locations that are coupled together with a wide area network 128.

The billing function 324 performs billing to all the users of the system 100. Purchases, leases and service contract expenses are collected by the billing function 324 from the appropriate electronic payment organization 132 authorized by the user. From the web interface 108, the user enters the information necessary to enable the payment transfer for the expenses incurred. Some expenses, such as business equipment purchases, supplies purchases and pay-for-term service contracts, result in a single billing transaction while others, such as business equipment leases, pay-as-you-go service contracts and pay-in-advance service contracts, result in recurring billings. The reoccurring billings may be preauthorized or request reauthorization each time. Reauthorization requests are automatically generated whereafter the user manually provides authorization through the web interface 108 or another automated interface. In some embodiments, a user may be billed for any charges from the system 100, whereafter, the user can pay the invoice with a check or other conventional payment method.

The messaging function 308 facilitates communication to the wireless data center(s) 120 that communicates with the WAP service terminal 124 and the data capture device 116. Any formatting, translation and/or handshaking are performed to convey the messages to and from the wireless data center 120. The messaging function 308 may support any number of wireless data centers 120 that are used in various geographic locations. A query to the customer database 332 allows determining the type of wireless data center 120 used to communicate with a particular destination.

Service calls are managed by the service scheduling and dispatch function 312. A service call may be initiated from the web interface 108, a call to customer service, the service call button 216, or a condition detected by the data processor 204. However the service call is begun, the scheduling and dispatch function 312 is referenced to determine the technician and time for handling the service call. The technician database 336 is referenced to determine the qualified technicians capable of adequately servicing the service call for the particular business machine 112. This determination may involve analysis of the type of service call, the technicians available, the technicians that have serviced the business machine before, and other factors. A message is sent to the selected technician that describes the service call along with contact information for the user retrieved from the customer database 332. The technician will perform the service call and report any results that are wirelessly transmitted back to the scheduling and dispatch function 312. The service call and resolution are noted in the machine database 320.

Some service contracts include supplies for the business equipment 112 such as toner, ink, paper, cleaning supplies, etc. The data capture device 116 records use of the business machine 112 and records use of consumables in the machine database 320. In some circumstances, the supply management function 316 predicts when supplies will be needed and automatically ships them to the user at business machine location. In other circumstances, an electronic message is sent to the user asking for information on the supplies such that verification is made before shipping out more supplies.

In any event, the user can log onto the web interface to order supplies regardless of whether they are included in a contract. If there is no supply contract, the user is billed for any supplies ordered. When supplies are requested that are included in the supply contract, a check is made to determine if the amount of supplies used is within an allowable range for the business machine 112 given the usage reported by the data capture device 116. In this way, abusers of the supply contract can be detected. All supply usage is recorded in the machine database 320.

There are three databases 320, 332, 336 in this embodiment of the operations center 104. Those skilled in the art appreciate that the databases 320, 332, 336 could be combined or separated in any logical manner and may run on one or more computers in one or more locations. A data mining function 328 allows determining relationships between the data stored in the databases 320, 332, 336. For example, a manufacturer may want to know the number of service calls for a particular model of business machine. Information such as this can be used to determine the pricing for the service contracts or determine when preventative maintenance is advisable.

The customer database 332 stores information about the user of the business machine 112. In most organizations, a contact person is typically assigned to manage the business machines 112. This person is recorded in the customer database 332 along with ways to contact this person electronically, in-person and over the phone. In addition to contact information, account information is entered by the contact person into the web interface, such as electronic payment information. Also the customer database lists all the business machines 112 associated with that user.

In the technician database 336, information on the technicians available to the management system 100 is stored. Each technician has qualifications for various business machines 112 stored in this database 336. The current schedule and current location of each technician is also recorded in the technician database along with contact information for the technician. For example, the type of wireless data center 120 the technician uses for electronic messages to the service terminal 124 is recorded in this database 336.

The machine database 320 stores information related to a particular machine. This information includes the service records, the supply usage, unused supplies at the user location, the user associated with the business machine, etc. The service records include past service calls and their resolution, past preventative maintenance, scheduled preventative maintenance, etc. Some of the information in the machine database 320 is made available to the user by way of the web interface 108. In instances where the user bought the business machine 112 used, any information in the machine database 320 may be retained for the new user.

Figure 4:
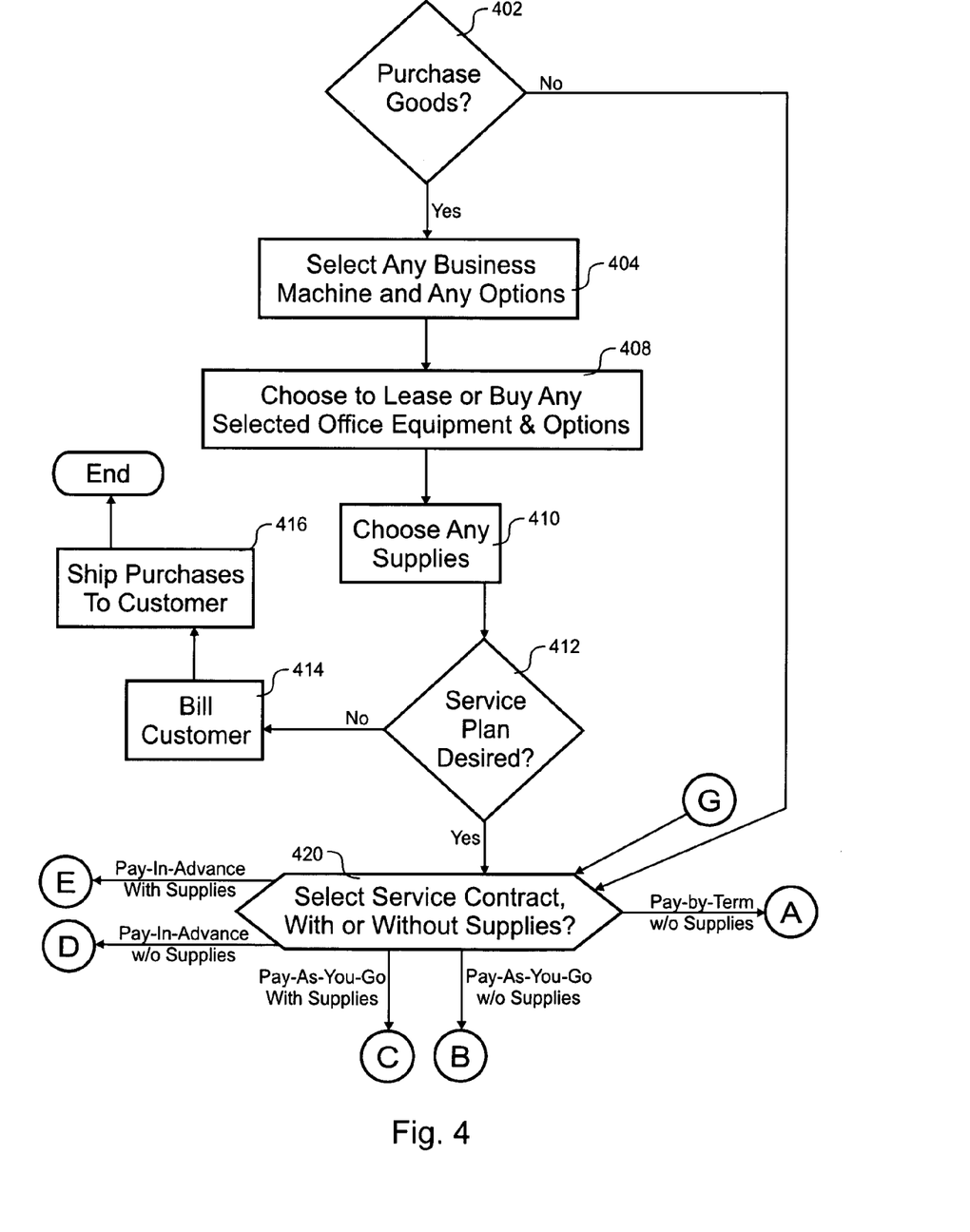
FIG. 4 is a flow diagram of an embodiment of a process for purchasing office equipment and/or supplies and/or selecting a service contract for any office equipment.

Referring next to FIG. 4, a flow diagram of an embodiment of a process for purchasing office equipment 112 and/or supplies and/or selecting a service contract for any office equipment 112 is shown. The depicted process begins in step 402 where a determination of whether any items should be purchased by the user. Business machines 112, options and supplies can be purchased by proceeding to step 404. Any business machine and options are selected in step 404. The user can lease or purchase the office equipment 112 and options in step 408. Other embodiments may allow renting of the office equipment 112 also. Where supplies are desired, they can be purchased in step 410. Some service plans include supplies such that a user is unlikely to purchase supplies in step 410 where supplies are part of the service contract.

If no service plan is desired in step 412, the customer enters payment information and the electronic payment organization is debited for the amount owed in step 414. Once payment is taken care of, the purchases are shipped to the customer in step 416. If no service plan is desired in step 412, a data capture device 116 is not necessary in this embodiment. In some embodiments, a data capture device 116 could be included regardless of a service or supply contract.

If a service plan is desired in step 412, processing continues to step 420 where a service and/or supply contract is chosen. This embodiment allows selection of five different contracts: pay-by-term service contract without supplies (see FIG. 5A), pay-as-you-go service contract without supplies (see FIG. 5B), pay-as-you-go service contract with supplies (see FIG. 5C), pay-in-advance service contract without supplies (see FIG. 5D), and pay-in-advance service contract with supplies (see FIG. 5E). Other embodiments, may limit the types of contracts available based upon the model of business machine 112 covered by the contract. For example, a scanner would not normally need any supplies so contracts that provide supplies could be excluded at step 420. Selection of the type of contract dictates which of FIGS. 5A-E will continue the process as respectively described below.

Figure 5A:
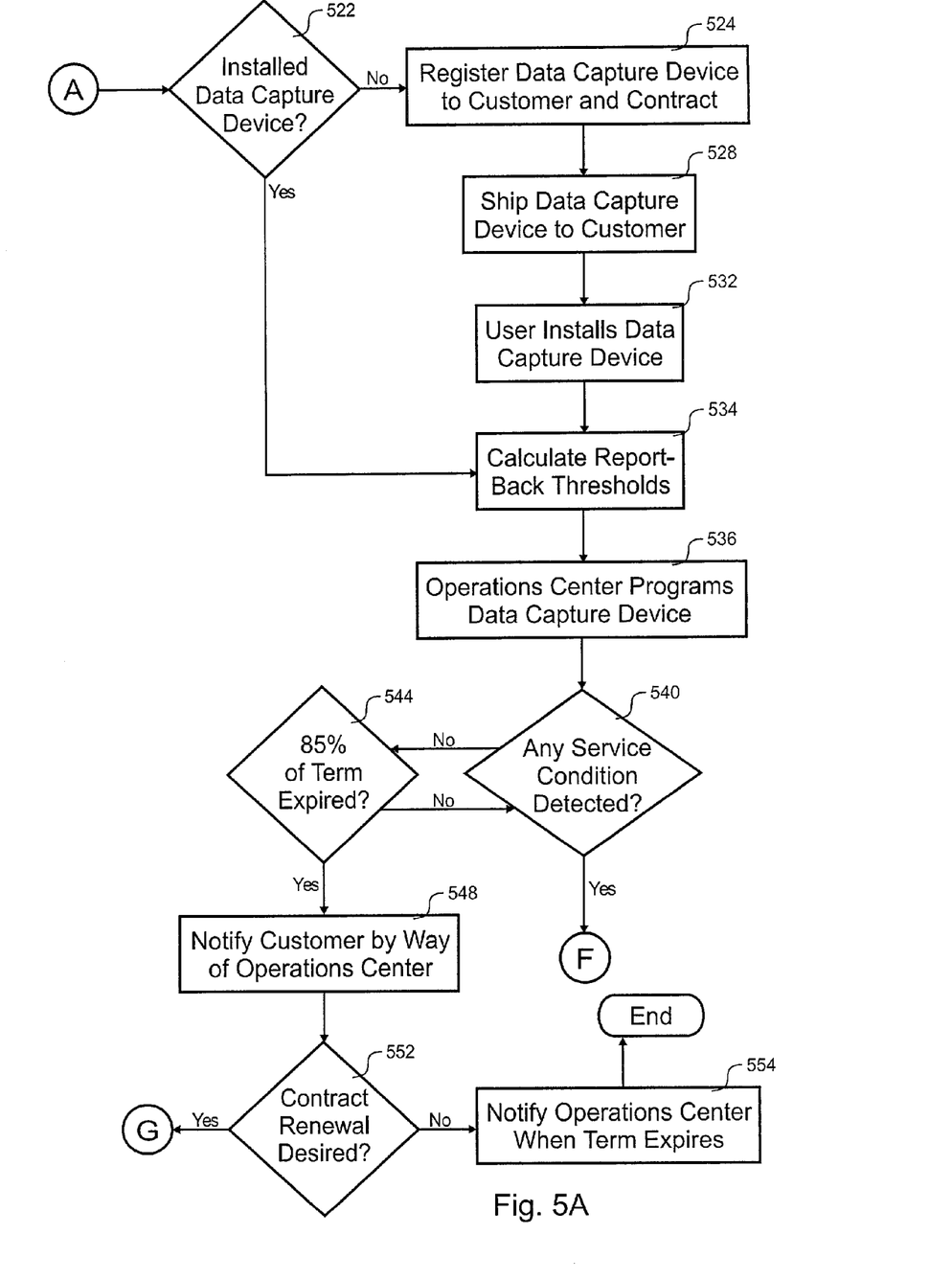
FIG. 5A is a flow diagram of an embodiment of a process followed for a pay-by-term service contract without supplies.

With reference to FIG. 5A, a flow diagram of an embodiment of a process followed for a pay-by-term service contract without supplies is shown. A pay-by-term service contract allows buying service in advance for a predefined period. This embodiment does not provide for supplies to be included, but other embodiments could provide supplies. The depicted portion of the process takes-up in step 522 where a determination is made by the operations center 104 of whether there is a data capture device 116 already installed. The machine database 320 can be queried for this information and the data capture device 116 could be queried for further verification. A data capture device 116 will already be installed because the user is reviewing their contract.

Where no data capture device 116 has been installed, processing continues to step 524 where a data capture device 116 is registered to the customer and contract. The machine database 320 is updated to reflect the address of the data capture device 116, business machine serial number, business machine model, and wireless data center 120 used for communication with the data capture device 116. The customer database 332 is also updated to reflect that the data capture device 116 is assigned to that customer. In step 528, the data capture device 116 is shipped to the customer for installation. Other embodiments could install the data capture device 116 prior to shipment to the customer, but in this embodiment, the customer installs the data capture device 116 in step 532. Further, a technician could install the data capture device 116 in some embodiments.

Once power is applied to the data capture device 116, information is sent back to the operations center 104. The operations center 104 determines report-back thresholds in step 534. For example, when 85% or some other threshold percentage of the contract term has expired, the data capture device 116 will inform the operations center 104 of this. Other event thresholds could include changing of toner or ink, unplugging of the business machine 112, opening of the business machine 112, error conditions detected, page counts being exceeded, activation of the service call button 216, etc. Different business machines 112 may support different features, such that the event thresholds may be customized for each business machine model and/or contract. Wirelessly, the event thresholds are loaded into the data capture device 116 in step 536.

Figure 6:
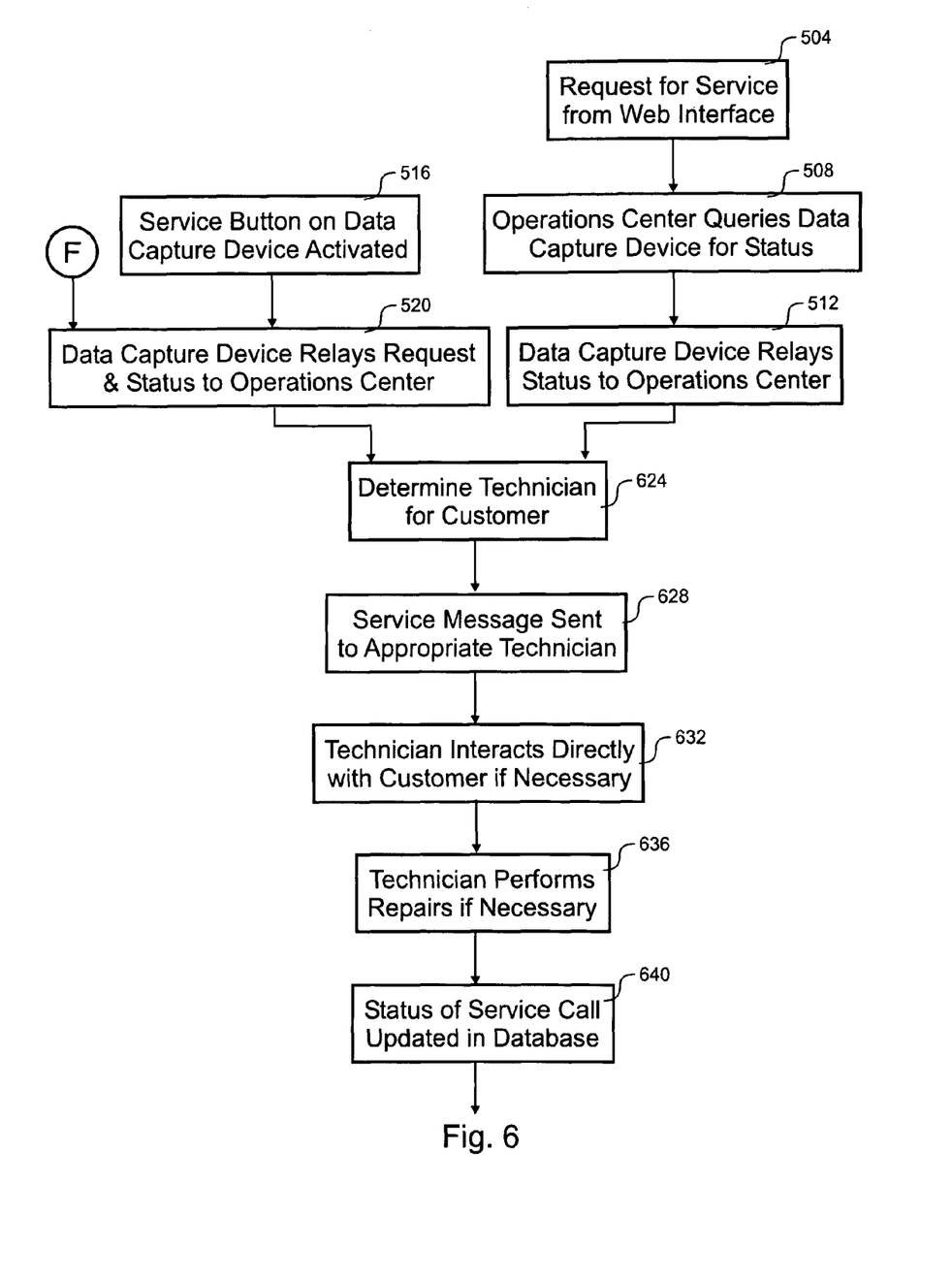
FIG. 6 is a flow diagram of an embodiment of a process for servicing an business machine.

If any service condition is detected in step 540, a service call is started and processing continues to FIG. 6. A service condition is an error detected by the data capture device 116 that would warrant a service call. Alternatively, processing continues to step 544 if there is no service condition detected. If the threshold event of 85% of the pay-by-term contract expired is not satisfied in step 544 processing continues back to step 540. Where the threshold event is triggered, processing continues to step 548 where the customer is electronically notified of the impending end of the contract period. The notification could be by e-mail, instant message, WAP message, web page notice, or other electronic notification methods. If the user desires to start a new contract in step 552, processing continues back to step 420 of FIG. 4. In some embodiments, the user can select to make the renewal of the same type of contract automatic such that without intervention the same contract type will be renewed.

Where a new contract is not desired in step 552, the term will expire in due course. A threshold event in the data capture device 116 notifies the operations center 104 of the expiration of the contract in step 554. Service calls after expiration are not covered by the contract. Although the above embodiment relies upon the data capture device 116 for notification of contract threshold events, some embodiments could have the operations center 104 also track this information. For example, when the contract term is at 85%, a notification could be sent out regardless of any triggered report from the data capture device 116.

Figure 5B:
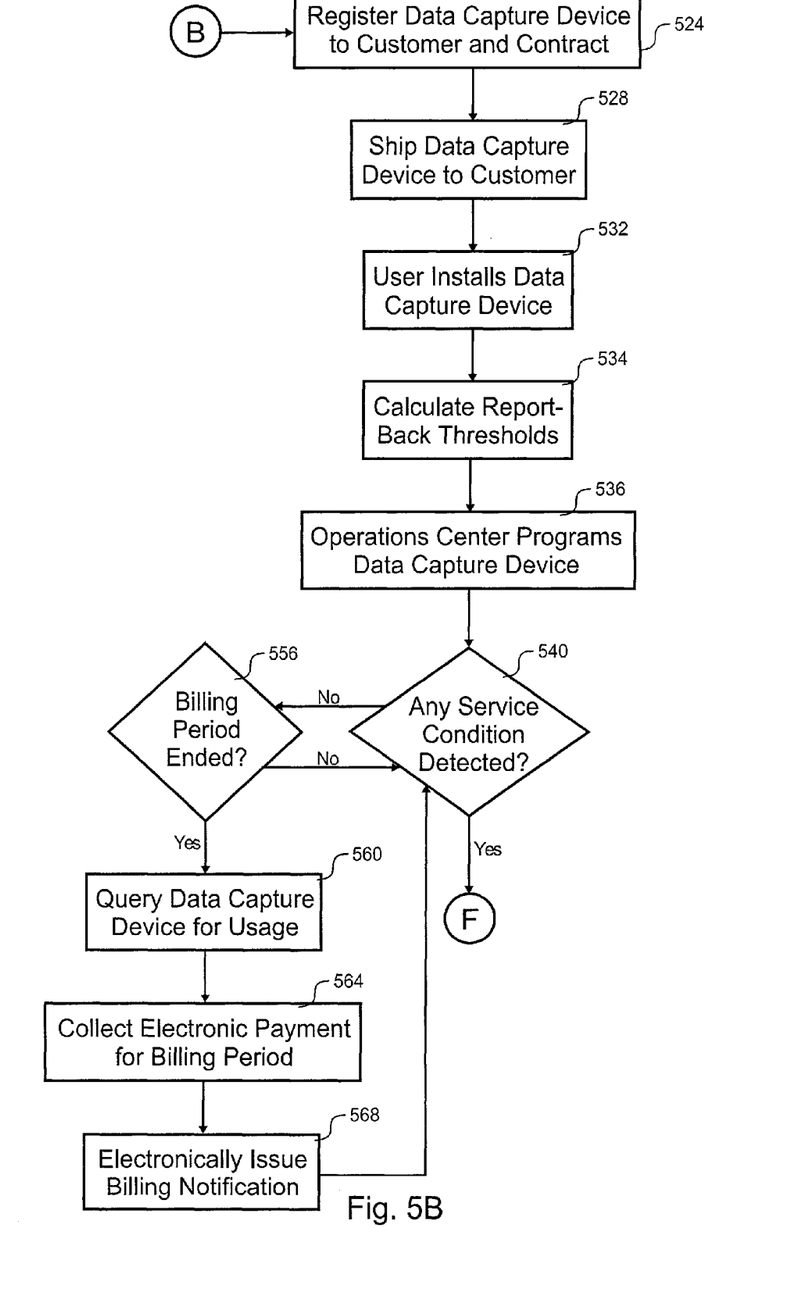
FIG. 5B is a flow diagram of an embodiment of a process followed for a pay-as-you-go contract without supplies.

Referring next to FIG. 5B, a flow diagram of an embodiment of a process followed for a pay-as-you-go contract without supplies is shown. In a pay-as-you-go contract, the user pays in arrears for the service contract that may be tied to usage. For example, there may be a one cent charge for service per page printed so long as usage is under a thousand pages per month. Where usage exceeds a thousand pages per month, a half cent may be charged per page in excess of one thousand. In another example, the user may be charged a flat fee for the service contract of the last month regardless of usage.

This embodiment presumes the business machine 112 does not have a data capture device 116 installed, but some embodiments could already have one installed. Steps 524, 528, 532, 534, 536, 540 largely operate as discussed in relation to FIG. 5A. In step 556, a threshold event programmed in step 536 is tested to see if the billing period has ended. If it has not ended processing loops back to step 540.

Where the billing period threshold event is triggered in step 556, the operations center 104 is notified. Independently, the operations center 104 may detect expiration of the billing period. In some embodiments, the data capture device 116 is not programmed to report the end of the billing cycle. After the end of the billing period is determined in step 556, the data capture device is queried for usage in step 560.

Payment for the service contract over the prior billing period is performed in step 564. The billing function 324 uses the electronic payment information stored in the customer database 332 to get payment from the specified electronic payment organization 132. The electronic payment information could include a credit card, electronic funds transfer or other method of electronic payment. In some embodiments, an invoice may be issued in a conventional manner where a bill is electronically or mechanically issued and payment follows. Once the payment is collected, a billing notification is issued electronically in step 568, whereafter, processing loops back to step 540. The electronic notification could be via an electronic message or a posting through the web interface 108. Further, some embodiments could issue a paper billing notification by mail.

Figure 5C:
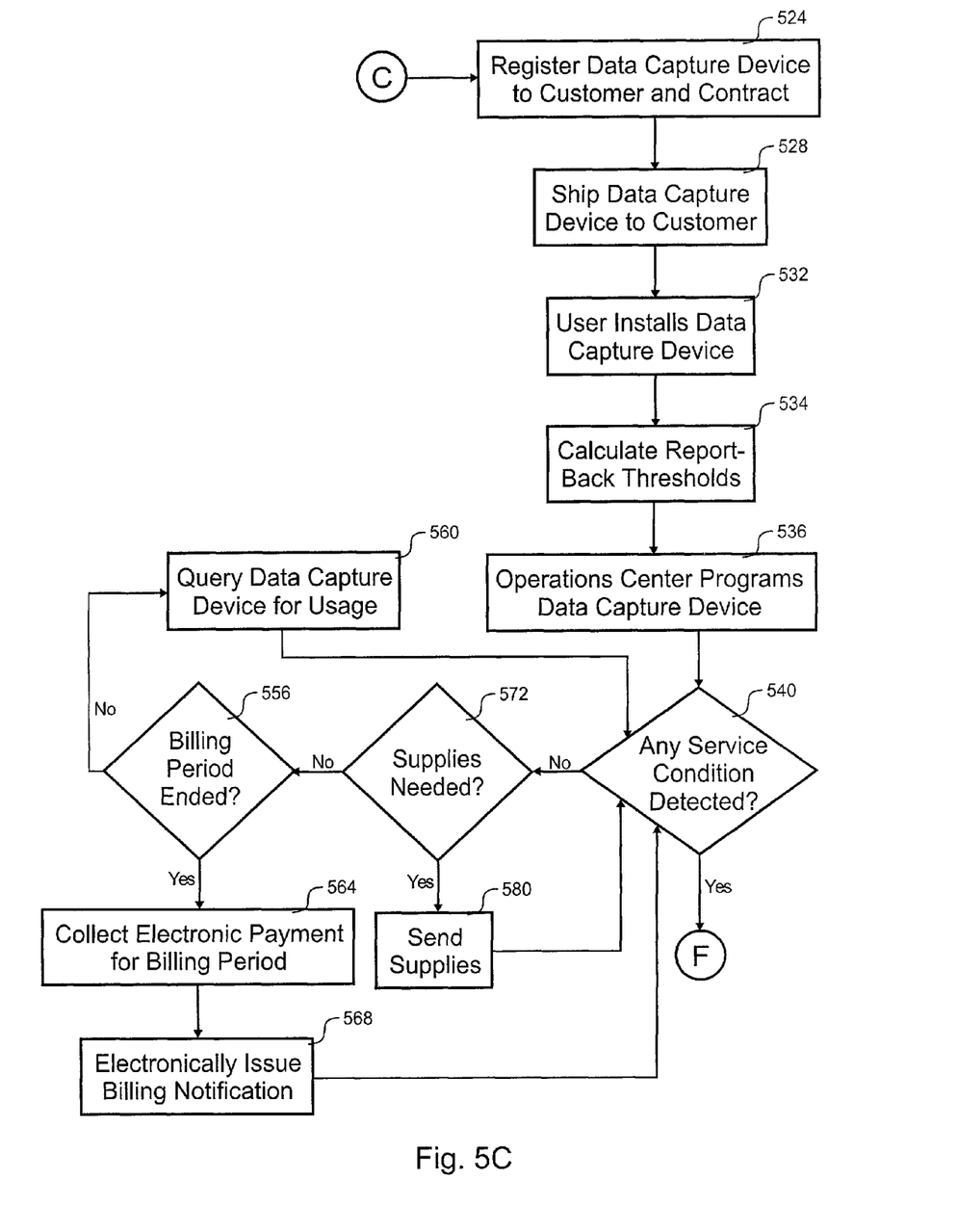
FIG. 5C is a flow diagram of an embodiment of a process followed for a pay-as-you-go contract with supplies.

With reference to FIG. 5C, a flow diagram of an embodiment of a process followed for a pay-as-you-go contract with supplies is shown. This embodiment is similar to the embodiment of FIG. 5B except that supplies for the business machine 112 are included in the service contract. New steps 572 and 580 and the repositioning of step 560 accommodate the supply contract.

After testing for a service condition in step 540, a determination is made in step 572 of whether supplies are needed. Determination of whether supplies may be needed is performed by the supply management function 316. In step 560, the data capture device is queried for usage at a predetermined interval, such as once a day. Additionally, some of the threshold events set in step 536 could include detection of paper, toner, ink or other consumables being added to the business machine 112. Additionally, the supply management function may electronically send questionnaires to the user to determine supply on hand. Through the above mechanisms, the supply management can gauge the amount of supplies on hand to deliver to the user. In step 580, any supplies are sent to the user. In some cases, the user could indicate through the web interface that supplies are needed which would override any automatic determination by the supply management function 316.

Figure 5D:
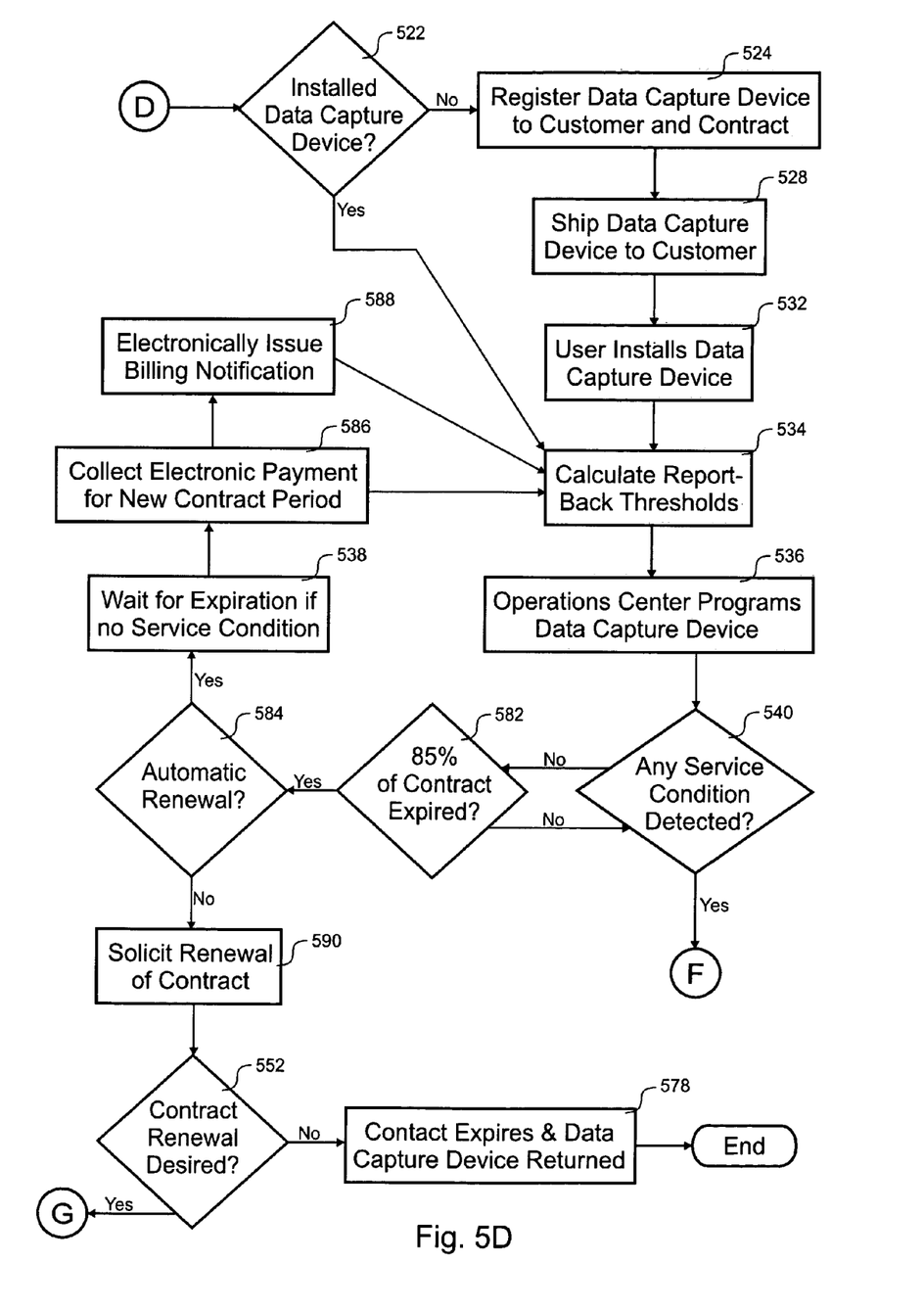
FIG. 5D is a flow diagram of an embodiment of a process followed for a pay-in-advance contract without supplies.

Referring next to FIG. 5D, a flow diagram of an embodiment of a process followed for a pay-in-advance contract without supplies is shown. With the pay-in-advance contract, the user pays service in advance that is limited to a certain amount of usage. For example, the user may purchase service on a scanner that expires when the five thousand scans have been performed. In some embodiments, there may be some time constrains put on that usage, for example, the service for the five thousand scans could expire in a year. This embodiment does not include supplies along with the service contract. Steps 522, 524, 528, 532, 534, 536, 540 largely operate as discussed in relation to FIG. 5A.

Picking-up the explanation in step 582, a determination of whether the contracted usage has reached 85%, for example, of the total is performed. Back in step 534 and 536, a threshold event was determined and programmed into the data capture device 116 that corresponded to 85% of contract usage. For example, the threshold event is triggered after 4,250 scans of a 5,000 scan contract. Although the data capture device 116 has primary responsibility for determining the triggering of threshold events, the operations center 104 also tests for missed threshold events when usage is reported by the data capture device 116. Where 85% of contract usage has not been consumed, processing loops back to step 540 to check for service conditions again.

Where 85% of the contract usage is detected consumed by the data capture device, processing continues to step 584 to determine if automatic renewals are authorized. If automatic renewals are authorized, the remainder of the contracted usage is consumed in step 538 so long as no service condition is detected. In step 586, the electronic payment is collected by the billing function 324 from the electronic payment organization 132 configured by the user. A billing notification is issued in step 588 and processing loops back to step 534.

Where an automatic renewal is not authorized as determined in step 584, processing continues to step 590 where an electronic solicitation for renewal is sent to the user. Some embodiments, may supplement the electronic solicitation with a human performed solicitation where there is no response to the electronic solicitation. If the user desires to renew the contract as determined in step 552, processing loops back to step 420 of FIG. 4. The web interface 108 is used to select another service contract in step 420. Where no renewal is desired, the contract expires in step 578 and arrangements are made for the user to return the data capture device 116.

Figure 5E:
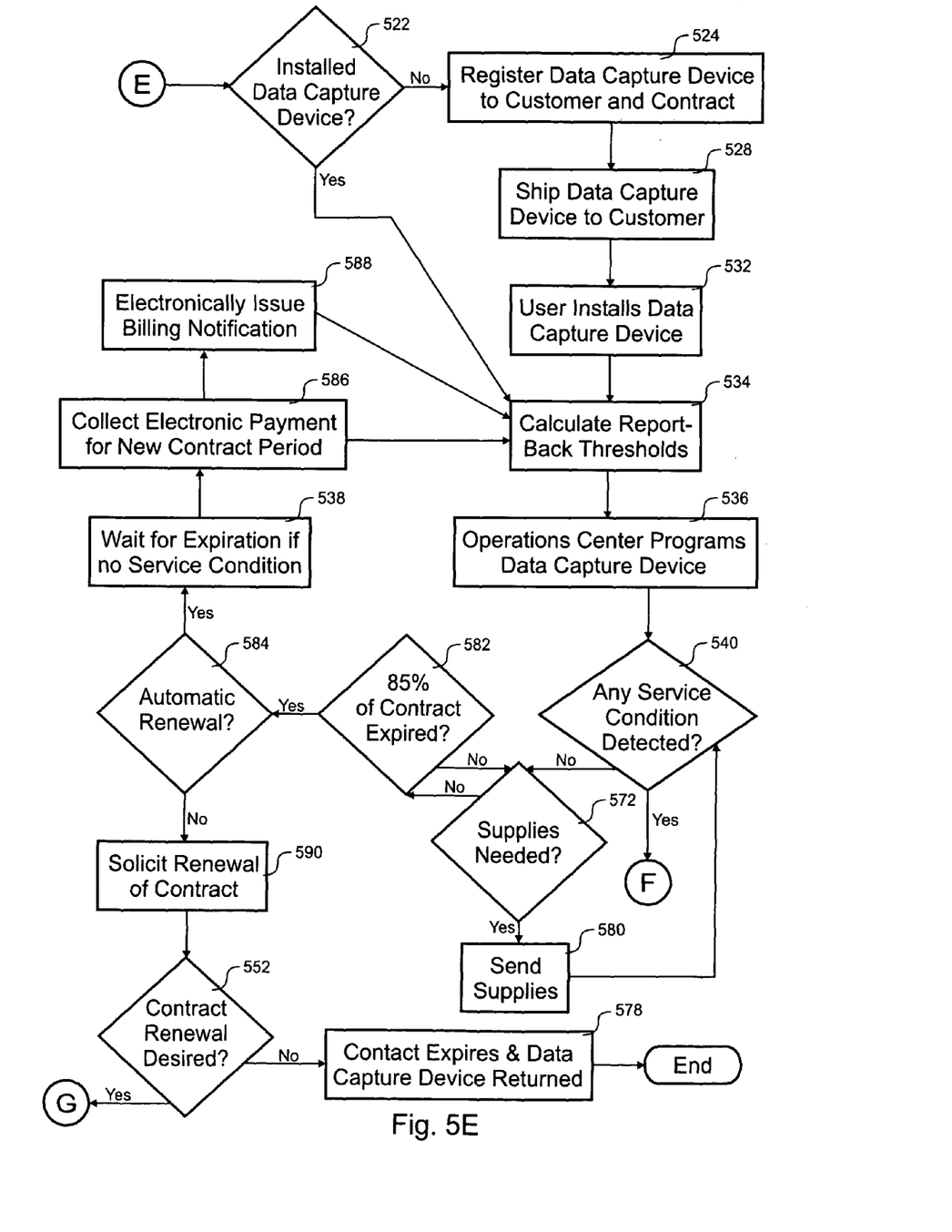
FIG. 5E is a flow diagram of an embodiment of a process followed for a pay-in-advance contract with supplies.

With reference to FIG. 5E, a flow diagram of an embodiment of a process followed for a pay-in-advance contract with supplies is shown. To accommodate the provisioning of supplies, new steps 572 and 580 are added to the embodiment of FIG. 5D. In step 572, a determination is made in step 572 as to whether supplies are needed and any supplies are sent in step 580 as described more fully in relation to FIG. 5C above.

Referring next to FIG. 6, a flow diagram of an embodiment of a process for servicing a business machine 112 is shown. There are number of ways in this embodiment to initiate a service call, such as activating the service call button 216, automatic detection of a service condition by the data capture device 116 and a request for service from the web interface 108. In some embodiments, the user may also call a support line for service related issues.

In step 516, a service call button 216 on the data capture device 116 is activated. In some embodiments, the button function is integrated into the control panel of the business machine 112. The control panel display could interact with the user using a diagnosis wizard to determine the type of service condition. Further, the person reporting the service condition could enter or verify contact information for the technician to use when investigating the service call. Any information gathered would be relayed with the service call to the WAP service terminal 124 of the technician. Further, the service call function could be password protected so that only authorized users of the machine 112 could initiate such a call. Regardless of whether the service call button was activated or the data capture device detected the service condition, processing continues to step 520 where any information relating to the service call or status of the business machine 112 is relayed back to the operations center 104.

Stepping back to step 504, a request for service can be made using the web interface 108. A wizard process may also be used to facilitate an adequate description of the service condition. The wizard process is just a smart system that asks questions in series in an attempt to diagnose the service condition. In some embodiments, forms could be used instead of or in addition to the wizard process. A query is made to the data capture device 116 by the operations server 104 for any status information or errors detected in step 508. The data capture device 116 relays the pertinent information back to the operations center 104 in step 512.

Regardless of how the service call was initiated, a determination of the technician to act on the service call is determined in step 624. The technician database is queried to determine the location, availability and skill level of the technicians. In one embodiment, one or more technicians are pre-assigned to a particular machine 112 to ease this process and to provide a technician that may be familiar with the user and office location. The service call information is logged into the machine database 320 in order to have accurate status for the business machine 112.

Once the appropriate technician is located in step 628, an electronic message is sent to that technician. The messaging function 308 formulates the message and sends the message through the wide area network 128 and wireless data center 120 to the WAP service terminal 124 of that technician. After reading through the message, the technician calls to the user in step 632, if necessary, for further information. Sometimes the service condition can be solved on the phone and sometimes further information is needed to determine if a part is needed, for example. Any repairs needed are performed in step 636. The status of the service call is recorded in the machine database 320 in step 640.

A number of variations and modifications of the invention can also be used. For example, supply contracts are integral to service contracts in the above embodiments. Other embodiments could provide a supply contract with or without a service contract. In some embodiments, certain threshold events are defined with specific numbers, such as 85% of contract usage expiring. Those skilled in the art will appreciate that those threshold events could have any values assigned to them and are not limited to specific examples in the disclosed embodiments.

While the principles of the invention have been described above in connection with specific apparatuses and methods, it is to be clearly understood that this description is made only by way of example and not as limitation on the scope of the invention.

What is claimed is:

1. A method for automating management of a service contract for a business machine associated with a user, the method comprising steps of:
   providing a data capture device proximate to a business machine, the business machine comprising a selection from the group consisting of a copier, a printer, a fax machine, a scanner, and any combination thereof;
   receiving identification of a threshold event associated with the service contract, the threshold event set by a user with a web interface allowing remote modification of the service contract to thereby modify the threshold event, and the threshold event comprising a selection from the group consisting of a usage count for the business machine, a detected error in the business machine, a predetermined time period, and any combination thereof;
   programming the threshold event into the data capture device, wherein the data capture device monitors the business machine to log an occurrence of the threshold event;

receiving notification from the data capture device that the threshold event was logged by the data capture device, wherein the logging of the threshold event triggers the notification; and reporting information related to the service contract electronically and automatically to the user based, at least in part, upon the receiving step.

2. The method for automating management of the service contract for the business machine associated with the user as recited in claim 1, further comprising a step of receiving a service call by a technician automatically generated from user input.

3. The method for automating management of the service contract for the business machine associated with the user as recited in claim 1, further comprising a step of wirelessly notifying a technician of a service call for the business machine.

4. The method for automating management of the service contract for the business machine associated with the user as recited in claim 3, further comprising a step of contacting the user by the technician based upon the wirelessly notifying step.

5. The method for automating management of the service contract for the business machine associated with the user as recited in claim 1, further comprising a step of receiving service contract information from user by way of a web interface for an operations center.

6. The method for automating management of the service contract for the business machine associated with the user as recited in claim 1, further comprising steps of:
   determining if automatic contract renewals are authorized, and
   automatically renewing the service contract if authorized.

7. The method for automating management of the service contract for the business machine associated with the user as recited in claim 1, wherein the programming step includes a step of programming the threshold event into the data capture device from a point remote to the data capture device.

8. The method for automating management of the service contract for the business machine associated with the user as recited in claim 1, wherein the determining step is performed at a point remote to the data capture device.

9. The method for automating management of the service contract for the business machine associated with the user as recited in claim 1, wherein the data capture device includes a mechanism for placing a service request when manually activated.

10. The method for automating management of the service contract for the business machine associated with the user as recited in claim 1, wherein the data capture device comprises a wireless transceiver.

11. The method for automating management of the service contract for the business machine associated with the user as recited in claim 1, wherein the threshold event is one of the following:
    a first percentage of a contract period; and
    a second percentage of a contract usage.

12. The method for automating management of the service contract for the business machine associated with the user as recited in claim 1, further comprising a step of querying the data capture device for information.

13. The method for automating management of the service contract for the business machine associated with the user as recited in claim 1, further comprising steps of:
    remotely monitoring usage of supplies; and
    notifying the user when ordering of supplies is predicted to be warranted.

14. An automated business machine management system for business machines of users, the automated business machine management system comprising:
    a plurality of data capture devices, wherein:
        each data capture device is coupled to an associated business machine, each associated business machine comprising a selection from the group consisting of a copier, a printer, a fax machine, a scanner, and any combination thereof, and
        each data capture device comprises a wireless transceiver;
    an operations center in two-way communication with each of the plurality of data capture devices, wherein the operations center determines a threshold related to a service contract and communicates that threshold to one of the plurality of data capture devices, the threshold comprising a selection from the group consisting of a usage count for the business machine, a level of supplies for the business machine, a predetermined time period, and any combination thereof; and
    a web interface to the operations center, wherein:
        the web interface is remote to the operations center, wherein the web interface allows users to remotely interact with service contract information and thereby modify the threshold.

15. The automated business machine management system for business machines of users as recited in claim 14, wherein a plurality of service technicians are assigned to the plurality of business machines.

16. The automated business machine management system for business machines of users as recited in claim 14, wherein each of the plurality of data capture device is integral to its associated business machine.

17. The automated business machine management system for business machines of users as recited in claim 14, further comprising a plurality of wireless service terminals that receive service calls for the plurality of business machines.

18. The automated business machine management system for business machines of users as recited in claim 14, wherein at least one of the plurality of data capture devices comprises a mechanism for wirelessly requesting a service call.

19. The automated business machine management system for business machines of users as recited in claim 14, wherein:
    at least one wireless transceiver is coupled to a data center transceiver,
    the data center transceiver is coupled to a wide area network, and
    the wide area network is coupled to the operations center.

20. A method for automating management of a service contract for a business machine associated with a user, the method comprising steps of:
    providing a data capture device proximate to a business machine, the business machine comprising a selection from the group consisting of a copier, a printer, a fax machine, a scanner, and any combination thereof;
    receiving identification of a threshold event associated with the service contract, the threshold event set by a user with a web interface allowing remote modification of the service contract to thereby modify the threshold event, and the threshold event comprising a selection from the group consisting of a usage count for the business machine, a level of supplies for the business machine, and a combination thereof;
    programming the threshold event into the data capture device, wherein the data capture device monitors the business machine to log an occurrence of the threshold event;

receiving notification from the data capture device that the threshold event was logged by the data capture device, wherein the logging of the threshold event triggers the notification; and wirelessly notifying a technician to service the business machine, wherein the wireless notifying occurs automatically in response to the notification from the data capture device.

21. The method for automating management of the service contract for the business machine associated with the user as recited in claim 20, further comprising a step of:

reporting information related to the service contract electronically and automatically to the user based, at least in part, upon the receiving step.

22. The method for automating management of the service contract for the business machine associated with the user as recited in claim 21, wherein the threshold event is a malfunction in the business machine.

23. The method for automating management of the service contract for the business machine associated with the user as recited in claim 20, further comprising a step of receiving service contract information from user by way of a web interface for an operations center.

24. An automated business machine management system for business machines of users, the automated business machine management system comprising:

a plurality of data capture devices, wherein:

each data capture device is coupled to an associated business machine, each associated business machine comprising a selection from the group consisting of a copier, a printer, a fax machine, a scanner, and any combination thereof;

each data capture device is configured to monitor its associated business machine and to log monitored events; and each data capture device comprises a wireless transceiver;

an operations center in two-way communication with each of the plurality of data capture devices, wherein the operations center is configured to:

determine a threshold which triggers a service to be performed by a technician pursuant to a service contract, the threshold comprising a selection from the group consisting of a usage count for the business machine, a detected error in the business machine, a level of supplies for the business machine, a predetermined time period, and any combination thereof;

communicates that threshold to one of the plurality of data capture devices;

receive wireless notification from the one data capture device that the threshold was logged by the one data capture device, triggering the notification; and wirelessly notify the technician to service the associated business machine, wherein the wireless notifying occurs automatically in response to the notification from the data capture device; and a web interface remote to the operations center, wherein the web interface allows users to remotely interact with service contract information and thereby modify the threshold.

\* \* \* \* \*